United States Patent
Endt et al.

(10) Patent No.: US 8,791,376 B2
(45) Date of Patent: Jul. 29, 2014

(54) FLUID-TIGHT CABLE BUSHING FOR RIBBON CABLE

(75) Inventors: Joerg Endt, Dresden (DE); Joerg Gassmann, Dresden (DE); Majid Bakhshi, Berlin (DE)

(73) Assignee: Johnson Electric S.A., Murten (CH)

( * ) Notice: Subject to any disclaimer, the term of this patent is extended or adjusted under 35 U.S.C. 154(b) by 79 days.

(21) Appl. No.: 13/586,383

(22) Filed: Aug. 15, 2012

(65) Prior Publication Data

US 2013/0043070 A1 Feb. 21, 2013

(30) Foreign Application Priority Data

Aug. 17, 2011 (DE) .......................... 10 2011 110 380

(51) Int. Cl.
*H02G 3/18* (2006.01)

(52) U.S. Cl.
USPC ........... 174/663; 174/650; 174/659; 174/151; 248/56

(58) Field of Classification Search
CPC .................................. H02G 3/22; H02G 3/18
USPC ...................... 174/663, 151, 650, 659; 248/56
See application file for complete search history.

(56) References Cited

U.S. PATENT DOCUMENTS

| | | | | |
|---|---|---|---|---|
| 4,385,504 | A | * | 5/1983 | Perrone et al. ............... 62/259.1 |
| 5,216,203 | A | * | 6/1993 | Gower .......................... 174/663 |
| 5,442,140 | A | * | 8/1995 | Mc Grane ..................... 174/151 |
| 5,594,202 | A | * | 1/1997 | Tobias ........................... 174/505 |
| 5,887,427 | A | | 3/1999 | Maus et al. |
| 6,375,129 | B2 | * | 4/2002 | Koziol .......................... 248/68.1 |
| 7,071,412 | B2 | | 7/2006 | Dittes et al. |
| 7,875,797 | B2 | | 1/2011 | Moser |

FOREIGN PATENT DOCUMENTS

| | | |
|---|---|---|
| CH | 358482 A | 11/1961 |
| DE | 1490332 A1 | 1/1969 |
| DE | 1490624 A1 | 7/1969 |
| DE | 6947647 U | 4/1970 |
| DE | 2156608 A1 | 5/1973 |
| DE | 19517455 A1 | 11/1996 |
| DE | 19520758 A1 | 12/1996 |
| DE | 20210296 | 8/2002 |
| DE | 10306207 | 8/2004 |
| DE | 102004052497 | 5/2006 |
| EP | 1936750 A1 | 6/2008 |
| FR | 1594006 | 6/1970 |
| WO | WO 2007/118515 | 10/2007 |

* cited by examiner

*Primary Examiner* — Dhirubhai R Patel
(74) *Attorney, Agent, or Firm* — Muncy, Geissler, Olds & Lowe, P.C.

(57) ABSTRACT

A fluid-tight cable bushing for a ribbon cable has two profile supports. The ribbon cable extends through an opening in a penetration element, such as a housing for a switch or meter. The bushing has two profile supports each with a first flange having snap-on elements and a second flange. The first flanges extend symmetrical along and enclose the ribbon cable. To form a first fixation point, the snap-on elements are v-shaped and arranged to snap against a first end of the opening. To form a second fixation point, the second flanges extend laterally beyond a second end of the opening. A fluid-tight potting mass covers one of the fixation points. Preferably, the potting mass is disposed in a recess formed in the penetration element about the opening.

18 Claims, 5 Drawing Sheets

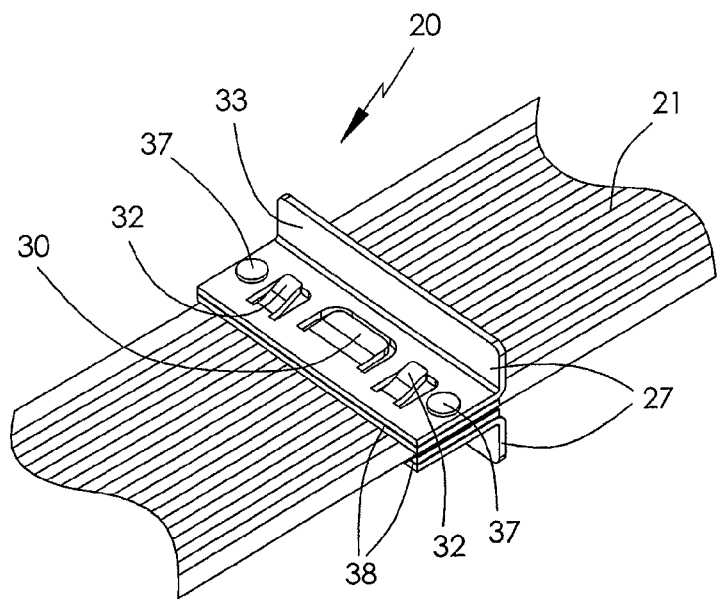
FIG. 9
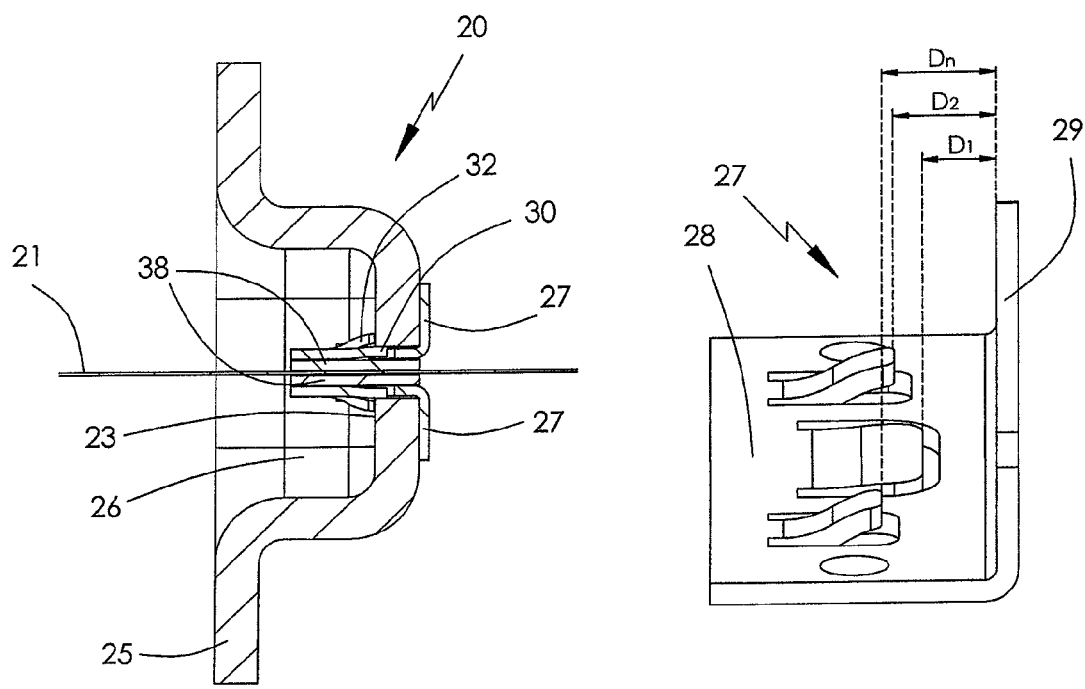
FIG. 10
FIG. 11

FLUID-TIGHT CABLE BUSHING FOR RIBBON CABLE

CROSS REFERENCE TO RELATED APPLICATIONS

This non-provisional patent application claims priority under 35 U.S.C. §119(a) from Patent Application No. 10 2011 110 380.9 filed in Germany on Aug. 17, 2011.

FIELD OF THE INVENTION

This invention relates to a fluid-tight cable bushing for ribbon cable, especially for use for gas meters and also for use in switch cabinets, computer terminals, vehicles or other electronic or electrical functional elements for industry.

BACKGROUND OF THE INVENTION

A number of solutions are already known from the prior art that disclose a gas-tight, liquid-tight or explosion-proof cable bushing.

Documents DE 1490332 A, DE 1490624 A, DE 2156608 A, DE 6947647 U, DE 19520758 A1 and CH 358482, all disclose gas-tight bushings for electrical conductors or cables. In these prior art solutions, the strands of the cables are either stripped of insulation individually and then encapsulated or mechanically compressed with costly structures in the bushing channel. The complicated layout of these solutions results in very high production costs. Even if separation of individual strands with subsequent encapsulation could be used in practice for specific applications, the solution, however, cannot open up the mass production market segment.

Another solution for sealing of a flat conductor relative to a housing wall, for example, a sheet metal wall, is described in EP 1936750 A1. Sealing occurs by means of a soft sealing element through which the conductor is pulled so that it is completely enclosed by the sealing element. A particular shortcoming of this solution is that sufficient sealing of the gas side cannot be guaranteed at high pressure. The high percentage of plastic means that at high temperatures the plastic deforms and the required sealing can no longer be guaranteed. At very high temperatures, as, for example, in the case of an accident in the gas meter, these bushings, are not suitable. Production of these bushings is also very expensive so that this form of cable sealing is not suitable for cost-effective mass production.

DE 19517455 A1 discloses a gas-tight cable gland using a shrinkage tube lined with adhesive. Here again the conductor must be processed individually in demanding fashion, which means high labor expense that leads to high costs in mass production.

Hence there is a desire for a fluid-tight cable bushing for ribbon cable that ensures high temperature stability and gas-tightness at high temperatures. There is an additional desire for a cable bushing usable in explosion-hazardous areas which is also suitable for cost-effective mass production.

SUMMARY OF THE INVENTION

Accordingly, in one aspect thereof, the present invention provides a fluid-tight cable bushing for a ribbon cable that is passed through an opening of a penetration element, which has at least one recess or shaping about an end of the opening. The cable bushing comprising: two profile supports with a first flange having a snap-on element and a second flange angled from it; and a fluid-tight potting mass. In the installed state, the first flanges of the profile supports extend symmetric to each other in the direction of the longitudinal axis of the ribbon cable and enclose the ribbon cable sandwich-like on both sides with surface contact. The snap-on elements of the first flanges are mounted v-shaped with an opening of the V facing the opening and the snap-on elements directly contacting a first end of the opening in a snap on manner to form a first fixation point. The second flanges of the profile supports extend fin-like laterally beyond a second end of the opening to form a second fixation point in the form of a stop surface. The fluid-tight potting mass covers one of the fixation points disposed in the area of the recess or shaping.

The essential advantage of the present invention is that the cable bushing, while ensuring the required fluid tightness, especially gas tightness at high temperatures, can be made from only a few components very compactly, which permits efficient mass production. The only very limited dimensions of the cable bushing permit its use even under very unfavorable installation conditions in which the opening of the penetration element must be chosen particularly small.

Such application is present, for example, when circuit boards or partitions of electrical or electronic components must be penetrated fluid-tight with the ribbon cable.

It is left to the user of the cable bushing according to the invention to guide the first flanges of the two profile supports either initially over the first opening end or optionally over the second opening end through the opening of the penetration element so that, depending on this arrangement, either the two second flanges that extend fin-like or the first flanges are positioned in the area of the recess or shaping of the penetration element and are covered and sealed accordingly with potting mass.

Liquid silicone is preferably used as potting mass, which is suitable for temperature ranges to 350° C. in order to achieve the desired gas tightness.

Adhesive films can be applied on the inside surfaces of the second flanges as glue or also cartridges, which burst during installation and release the glue and sealant. A sealing effect can also be simultaneously achieved here, which in special applications replaces additional potting mass and shaping and additionally facilitates installation.

The first flanges of the two profile supports according to the invention are glued to the flat sides of the ribbon cable. A flexible glue layer is applied, which is either already applied at the plant to the first flanges in contact with the flat sides of the ribbon cable or is present as a separate adhesive film which is only applied during installation of the cable bushing between the ribbon cable and the corresponding first flanges.

In a particularly preferred embodiment of the invention the flanges of both profiles supports extending fin-like laterally beyond the second end of the opening each additionally include an opening in which locking devices engage in shape-mated and/or force-fit fashion. These locking devices are connected either in one piece to the penetration element or formed as separate components, for example, in the form of pins. In the simplest case the penetration element comprising a metal sheet or plastic plate has punched shapes in the form of tabs, which on one side of the metal sheet or plastic plate lead to a profiled elevation and on the opposite side to a recess. If the forming tabs and the second flanges of the profile support provided with openings are positioned on the same side of the penetration element, these tabs can be inserted without problem to form an additional fixation point. In practice these material shapings are vulcanized with HT rubber and, as described previously, used as locking devices in the form of plugs.

It has proven to be particularly advantageous that the first flanges of the profile supports have recesses in addition to their snap-on elements, which contribute to an increase in contact surface and therefore better connection between the potting mass arranged in the recess or shaping and the first flanges of the profile supports. These recesses can then be formed as perforations or material recesses. Perforations in which the potting mass penetrates to the ribbon cable would be chosen, if the potting mass and plastic of the ribbon cable are compatible with each other. In the event of incompatibility, on the other hand, contact surface enlargement achieved exclusively by material recesses is chosen.

In this context it is also necessary to keep the other areas of the ribbon cable contact-free relative to the potting mass. For this purpose it is prescribed that the first flanges of the two profile supports extend beyond the potting mass in the final installed position so that the potting mass is positioned contact-free relative to the ribbon cable within the recess or shaping. Profile supports would most simply be chosen by one skilled in the art, the first flanges of which have a length dimension that is greater than the depth of the recess plus the length of the penetration opening. Since the potting mass ordinarily closes off the side of the penetration element facing it flush for manufacturing reasons, the ends of the two flanges of the profile support deliberately protrude beyond the potting mass.

In another preferred embodiment of the invention the corresponding snap-on elements of the first flange of the two profile supports are designed in the form of resilient snap-on tabs either as a punched material shape or as molded-on material. Production of the snap-on tabs is particularly simple, since they are present as a material shape of the profile support after punching, preferably made from metal. It is also not contrary to the idea of the invention, if profile supports made of special heat-resistant plastic are used instead of metal profile supports. This configuration is useful, for example, if there are no design requirements on an explosion-protected bushing.

In another preferred embodiment of the invention several resilient snap-on tabs of different length and/or position are arranged so that different fixation points are produced on the flange. Through this embodiment it is possible to achieve locking on penetration elements of different thickness with one flange design. The flanges can also be configured differently above and below the ribbon cable and have different snap-on points. In this case locking would occur either on the upper flange or on the lower flange. Through the configuration with two different snap-on points per flange it is possible, for example, to lock four different penetration elements of different thickness with one design. In penetration elements having a large thickness a larger opening is also required. This is particularly essential, when the opening is made by punching out. By applying two different spacers that are positioned above and below between the ribbon cable and the flange it is possible to adjust the overall height in a simple manner. At the same time damage to the ribbon cable during bending of the snapped-on tabs during installation is prevented. For stabilization and fixation of the spacers and the flanges with the ribbon cable, these are preferably glued and/or riveted. The flanges of both profile supports extending fin-like laterally beyond the second opening end can additionally have a glue surface to which glue and/or sealing material is applied.

According to the invention the two profile supports can be designed as L-shaped, H-shaped, I-shaped or T-shaped profile supports or profile supports shaped differently. Regardless of the special design of the profile supports, a reduction in the percentage of plastic in the area of the penetration opening of the penetration element to a minimum can be achieved by the cable bushing design sandwich-like, comprising two high temperature-resistant profile supports and the ribbon cable incorporated in between. By a matching slit of the penetration opening, in which the sandwich-like profile is introduced, the requirement for "maximum admissible leakage in the event of an error at temperatures of >650° C." can still be reliably maintained. L-shaped profile supports, however, have proven themselves during installation, since this serves as a stop during insertion through the penetration opening in the form of a slit.

The two profile supports according to preferred embodiments of the present invention may have flanges with equal lengths or with different lengths. Regardless of this, the profile supports used only in pairs can have different length, for example, when the cable bushing is positioned in the corner area of a penetration element and one of the profile supports can then be wrapped laterally around, or they can be designed identically for reasons of efficient mass production.

The significant advantages and features of various embodiments of the present invention relative to the prior art, are essentially:

the fluid-tight cable bushing with preferably metal profile supports and potting mass have explosive protection;

the fluid-tight cable bushing consisting only of a pair of preferably metal profile supports and a potting mass is designed particularly compact and is therefore suitable for mass production;

guarantee of the required fluid-tightness and heat resistance by appropriate choice of the potting mass and corresponding matching with a profile support and ribbon cable;

the preferably metal profile supports protect the ribbon cable from mechanically and chemically caused damage and form at least two fixation points in the area of the first opening end and second opening end;

by matching seating of the profile support enclosing the ribbon cable sandwich-like and reduction of the amount of plastic in the area of the penetration opening of the penetration element to a minimum the requirement for the "maximum admissible leakage in the event of an error at temperatures >650° C." can be reliably maintained;

the two fixation points are achieved by shape-mating of the profile supports with the penetration element and already lead to a reduction of leakage, installation is particularly simple and uncomplicated so that installation errors that have been registered thus far are avoided or at least reduced; and the profile supports are preferably designed as L-profile supports or as H-profile supports, U-profile supports, I-profile supports or T-profile supports.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

FIG. 9 illustrates two profile supports in accordance with a fifth embodiment of the present invention, the profile supports have snap-on tabs of different length and shown with two spacers and a ribbon cable before installation;

FIG. 10 is a sectional view of the assembled cable bushing according to the fifth embodiment; and FIG. 11 illustrates one profile support of a sixth embodiment, having snap-on elements giving different fixation points D1 to Dn.

DETAILED DESCRIPTION OF THE PREFERRED EMBODIMENTS

Figure 1:
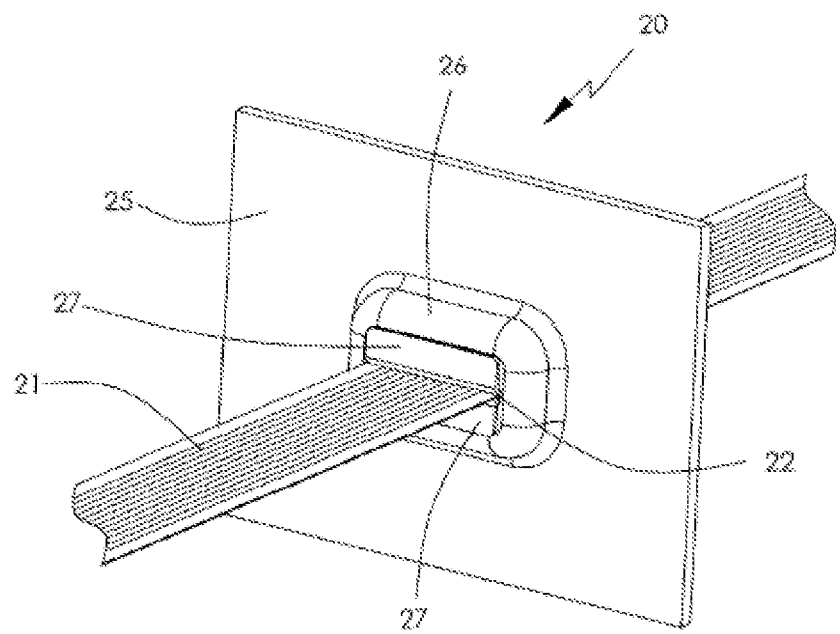
FIG. 1 is a view of a cable bushing in accordance with a first embodiment of the present invention, assembled with a cable and fitted to a housing.
Figure 2:
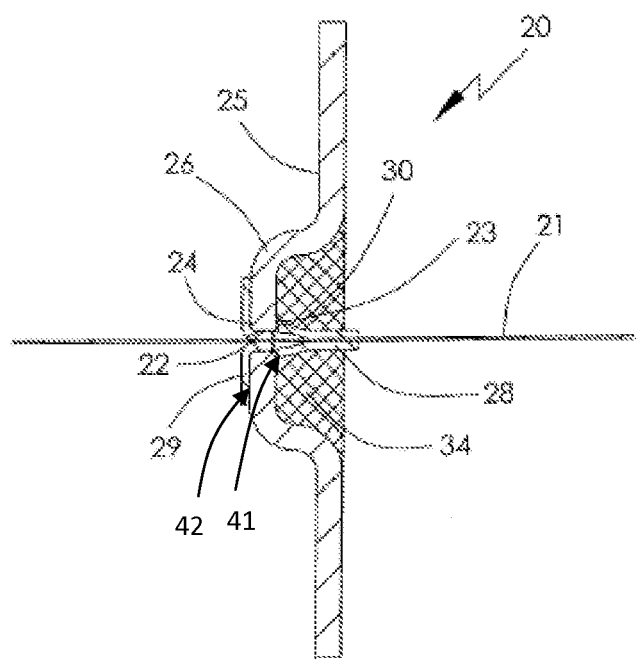
FIG. 2 is a sectional view of the cable bushing of FIG. 1.

FIG. 1 shows the cable bushing 20 according to a first embodiment of the present invention, in the installed state in cooperation with the penetration element 25. The penetration element is the housing, wall, etc., having an opening through which the ribbon cable must pass in a fluid-tight manner. FIG. 2 is a sectional view of the cable bushing 20 of FIG. 1. The fluid-tight cable bushing 20 guides the ribbon cable 21, through the opening 22 of the penetration element 25. The penetration element has a recess or shaping forming a depression 26 on a first end 23 of the opening. The cable bushing 20 has two profile supports 27 in the form of profile supports 27 with a first flange 28 having a snap-on element 30, see FIG. 3, and a second flange 29 angled from it. In the installed state the first flanges 28 of the two L-profile supports 27 extend symmetric to each other in the direction of the longitudinal axis of the ribbon cable 21 and enclose the ribbon cable 21 sandwich-like on both sides with surface contact. To form a first fixation point 41, the snap-on elements 30 of the first flanges 28 are mounted v-shaped directly on the first opening end 23 with the V opening facing the opening 22. In order to form a stop surface, i.e., a second fixation point 42, the second flanges 29 of the L-profile supports 27 extend fin-like laterally beyond the second end 24 of the opening 22. In addition, fluid-tight potting mass 34 is provided in the depression to cover the fixation point positioned in the area of the depression 26. As is apparent, the first flanges 28 of the two L-profile supports 27 extend beyond the potting mass 34 so that the potting mass 34 is arranged contact-free relative to ribbon cable 21 within the depression 26 of the penetration element 25.

Figure 3:
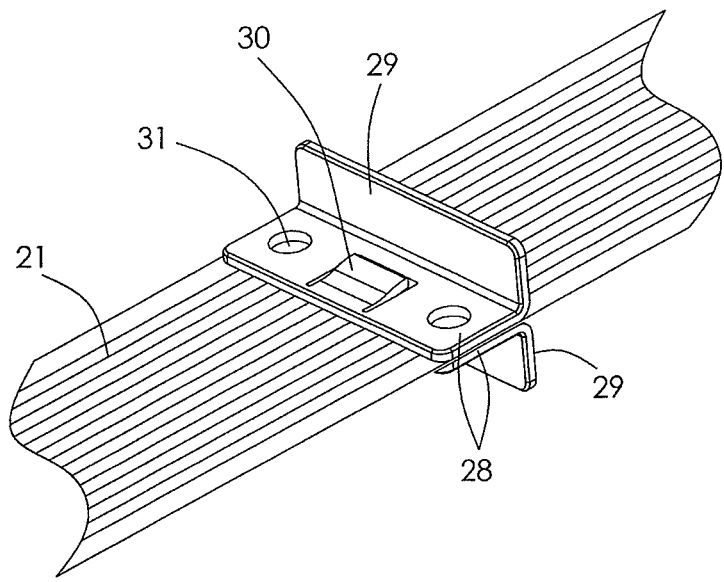
FIG. 3 is a view of two profile supports being parts of the cable bushing of FIG. 1.

FIG. 3 illustrates the two L-profile supports 27 of the first embodiment in cooperation with the ribbon cable 21 before installation. Both identically formed L-profile supports 27 are formed of metal. Each of these L-profile supports 27 is formed by a first flange 28, which extends parallel to ribbon cable 21 and a second flange 29, which is aligned orthogonal to the first flange 28. The first flanges 28 in this example have a greater length than the second flanges 29; the L-profile supports 27 are therefore designed non-equal-sided. Whereas the first flanges 28 of the two L-profile supports 27 are firmly glued on to the flat sides of the ribbon cable 21, the two second flanges 29 extend fin-like sideways from each other so that the L-profile supports 27 are combined to form a T-profile support with ribbon cable 21 enclosed in it. The first flanges 28 of the L-profile supports 27 have circular recesses 31 in the form of holes, in addition to their snap-on elements 30, which contribute to increasing the contact surface and therefore better connection between the potting mass 34 arranged in the depression 26 and the first flanges 28 of the L-profile supports 27.

Figure 4:
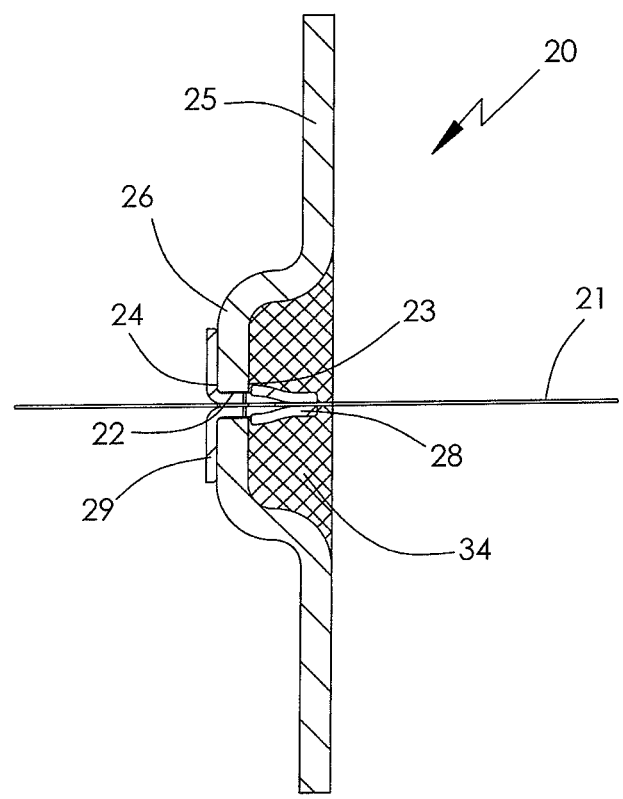
FIG. 4 is a sectional view of a cable bushing in accordance with a second embodiment of the present invention.

FIG. 4 is a sectional view of the cable bushing 20 according to a second embodiment. In principle, the structure of the cable bushing 20 depicted here corresponds to that of FIG. 2. As is apparent, the first flanges 28 of the two L-profile supports 27 are fully enclosed fluid-tight by the potting mass 34. The potting mass 34 in turn, fills the depression 26 so as to be flush with the surface of the penetration element 25. This requires that the potting mass 34 be neutral relative to ribbon cable 21, i.e., not chemically aggressive. In this embodiment the fluid-tightness of the cable bushing 20 is also guaranteed especially at very high pressure and the stability is additionally increased.

Figure 5:
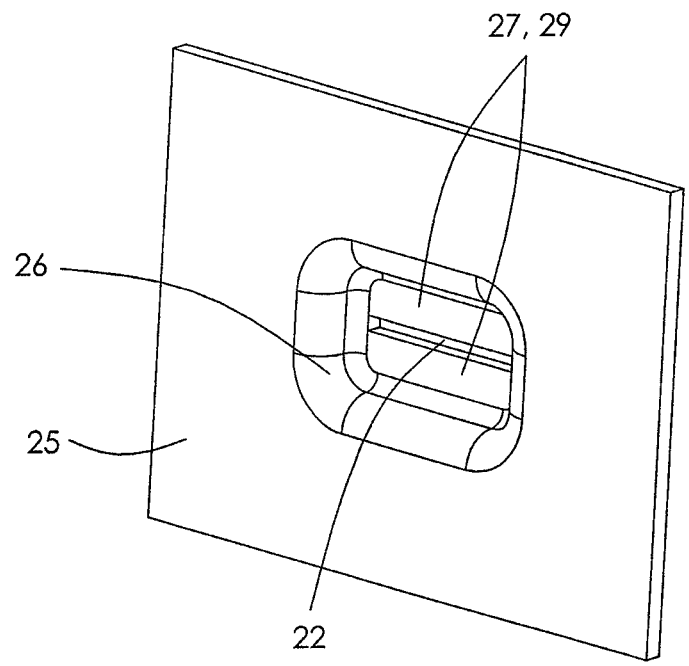
FIG. 5 illustrates a cable bushing according to a third embodiment.

FIG. 5 shows a cable bushing according to a third embodiment. The potting mass filling the depression and the ribbon cable are omitted to show details of the cable bushing. Whereas the first flanges 28 of the L-profile supports 27 in FIGS. 1 to 4 with their snap-on elements 30 are positioned in the area of the depression 26 and are then covered fluid-tight by the potting mass 34, in the example depicted here, on the other hand, the second flanges 29 of L-profile supports 27 extending fin-like are closed by the potting mass 34 fluid-tight, especially gas-tight. This means the two L-profile supports 5 are introduced relative to the variant according to FIG. 2 from the other side of the penetration element 25. Regardless of the chosen arrangement, either the snap-on elements 30 of the first flanges 28, see FIGS. 1, 2 and 4, or their second flanges 29 extending fin-like of the L-profile supports 27, see FIG. 5, are closed gas-tight by the potting mass 34 introduced to the depression 26. The potting mass 34 therefore covers, in each variant, the fixation point positioned in the area of the depression 26.

Figure 6:
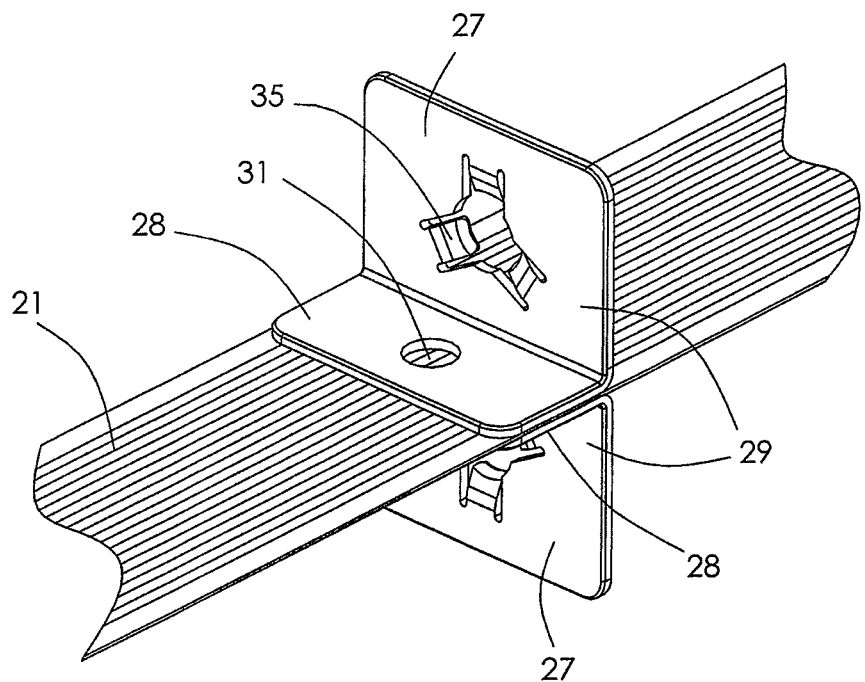
FIG. 6 is a view of two L-profile supports fitted to a ribbon cable, the two supports being parts of a cable bushing according to a fourth embodiment.

FIG. 6 shows the two L-profile supports 27 of a third embodiment in cooperation with the ribbon cable 21 right before installation. In direct comparison of this third embodiment with the first embodiment according to FIG. 3, we find that, instead of the snap-on elements 30 formed on the first flange 28, openings 35 are now used, which are formed on the second flange 29 of each L-profile support. These openings 35 cooperate with locking devices, which engage the openings 35 in shape-mated and/or force-fit fashion. Locking of the cable bushing 20 on the penetration element 25 according to the invention occurs in the depicted example exclusively by means of the second flanges 29 and the corresponding L-profile supports 27 and specifically, on the one hand, by the fin-like shaping, forming a first stop on the outside of the penetration element 25 and, on the other hand, by the locking devices 36. The locking devices 36 may be arranged in one piece with the penetration element 25 in the area of the depression 26 in the final installed state engage in shape-mated and/or force-fit fashion into the stellate opening 35 and therefore form a fixation point by clamping. The cable bushing 20 is therefore fixed in its alignment relative to opening 22 of the penetration element 25. The first flanges 28 of L-profile support 5 also have a recess 31 in the form of a hole, which contributes to an increase in contact surface and therefore better connection between the potting mass 34 arranged in the depression 26 and the first flanges 28 of the L-profile support 27. Whereas the first flanges 28 of the two L-profile supports 27 are firmly glued to the flat sides of the ribbon cable 21, the two second flanges 29 extend fin-like sideways from each other so that both L-profile supports 27 are combined during installation to form a T-profile support with the ribbon cable 21 enclosed in it.

Figure 7:
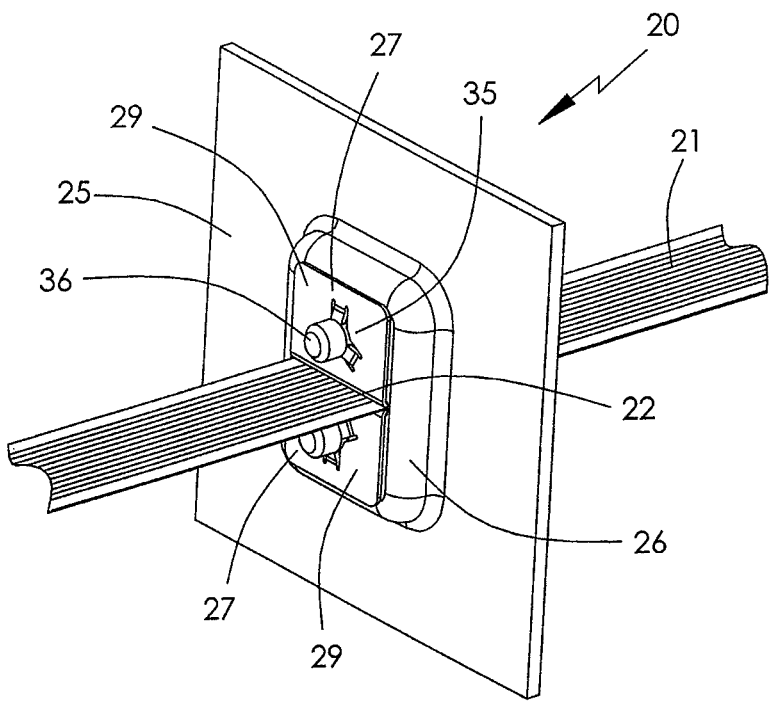
FIG. 7 illustrates a the assembled cable bushing of the fourth embodiment.
Figure 8:
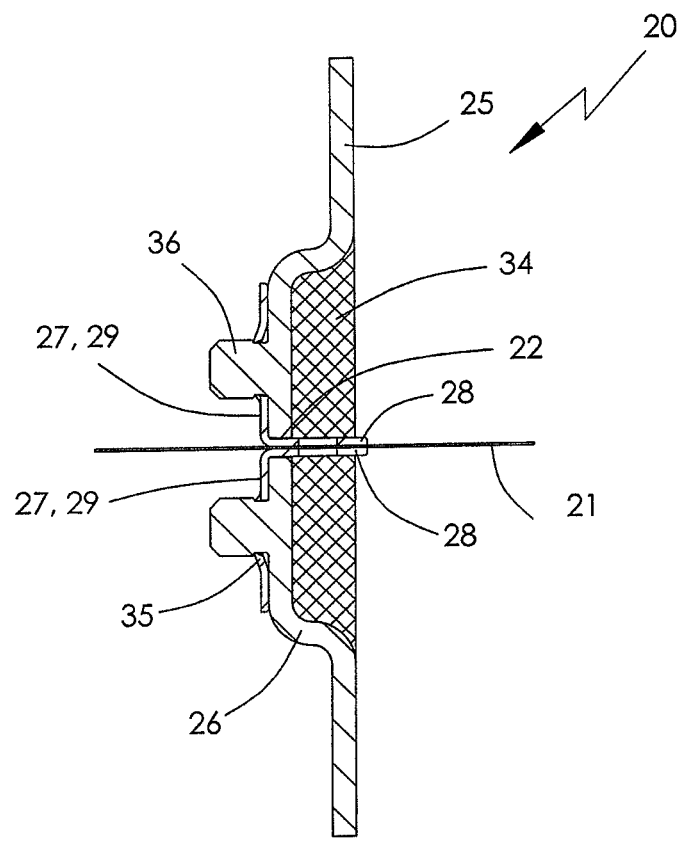
FIG. 8 is a sectional view of the cable bushing of FIG. 7.

FIG. 7 shows an assembled view of the cable bushing 20 of FIG. 6. FIG. 8 is a sectional view of the assembly of FIG. 7. The fluid-tight cable bushing 20 for ribbon cable 21, has of two L-profile supports 27 with a first flange 28 having a circular recess 31, see FIG. 6, and a second flange 29 angled from it, which includes an opening 35 to accommodate a locking device 36. In the installed state the first flanges 28 of the two L-profile supports 27 extend symmetrically to each in the direction of the longitudinal axis of the ribbon cable 21 and enclose the ribbon cable 21 sandwich-like on both sides with surface contact. To form a first fixation point the locking devices 36 formed in one piece to the penetration element 25 engage in the opening 35 in the second flanges 29 of the L-profile support in shape-mated and/or force-fit fashion. To form a stop surface the second flanges 29 of the L-profile support 27 extend fin-like laterally beyond the second opening end 24. A fluid-tight potting mass 34 is also provided, which is placed in the area of the depression 26 covering the first flange 28 of the L-profile support 27. As is apparent, the first flanges 28 of the two L-profile supports 27 extend beyond the potting mass 34 so that the potting mass 34 is arranged contact-free relative to the ribbon cable 21 within the depression 26 of the penetration element 25.

FIG. 9 shows a cable bushing 20 according to a fifth embodiment of the present invention before installation and FIG. 10 shows a sectional view of the cable bushing of FIG. 9 in the installed stated, with the potting mass omitted. The essential difference relative to the embodiment depicted in FIG. 3 is an additional spacer 38, arranged above and below the ribbon cable 21, the additional riveting 37 and additional snap-on elements 28. Through the spacers 38, which can preferably be formed of a fireproof material, the total design height, which is given by the profile supports 27, the ribbon cable 21 and the spacer 38, can be changed and adjusted in simple fashion. This is particularly advantageous, since the minimal admissible height of the opening 22 of the penetration element 25 occurs through a stamping process dependent on the thickness of the penetration element. The additional riveting 37 ensures reliable holding between the ribbon cable 21, spacers 38 and the profile supports 27, especially during installation. The snap-on elements 30 and 32, which are arranged on the first flange 28, have different positions and therefore different fixation points so that the distance to the second snap-on element 30 varies. The stop surface 33 of the second flange simultaneously serves as a glue surface on the penetration element 25. The stop surface 33 can be additionally provided with a sealing mass, which completely closes the opening 22 after installation and ensures gas-tightness without additional potting mass 34.

As shown in FIG. 10, only the snap-on element 32 is engaged with the end opening 23 because of the greater thickness of penetration element 25. The snap-on element 30, which is provided for a thinner penetration element 25, is not engaged and remains in opening 22.

FIG. 11 illustrates an L-profile support 27 of a cable bushing according to a sixth embodiment of the present invention. The L-profile support 27 has snap-on elements that are arranged differently so that different spacings D1 to Dn are provided to the stop surface of the second flange. The distances D1 to Dn simultaneously symbolize the differently possible thicknesses of a penetration element. Snap-on elements as shown in FIG. 9 are preferably arranged symmetric to the center axis. The snap-on elements can be different here in the profile supports arranged above and below the ribbon cable.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

For example, while the locking devices are shown as being an integral part of the penetration element, they may be formed as separate pins fixed to the penetration element.

The invention claimed is:

1. Fluid-tight cable bushing for a ribbon cable that is passed through an opening of a penetration element, which has at least one recess or shaping about an end of the opening, the cable bushing comprising:
    two profile supports with a first flange having a snap-on element and a second flange angled from it; and
    a fluid-tight potting mass,
    wherein, in the installed state, the first flanges of the profile supports extend symmetric to each other in the direction of the longitudinal axis of the ribbon cable and enclose the ribbon cable sandwich-like on both sides with surface contact,
    the snap-on elements of the first flanges are mounted v-shaped with an opening of the V facing the opening and the snap-on elements directly contacting a first end of the opening in a snap on manner to form a first fixation point,
    the second flanges of the profile supports extend fin-like laterally beyond a second end of the opening to form a second fixation point, and
    the fluid-tight potting mass covers the fixation point disposed in the area of the recess or shaping.

2. The cable bushing of claim 1, wherein the potting mass covering the recess or shaping, depending on the selected arrangement, closes fluid-tight either the snap-on elements of the first flanges or the second flanges extending fin-like of the profile supports.

3. The cable bushing of claim 1, wherein the first flanges of the two profile supports are glued to the flat sides of the ribbon cable.

4. The cable bushing of claim 1, wherein the second flanges of both profile supports extending laterally fin-like beyond the second end of the opening, each have an opening in which locking devices engage in shape-mated and/or force-fit fashion, the openings replacing the snap-on elements of the first flanges.

5. The cable bushing of claim 4, wherein the locking devices are either connected in one piece to the penetration element or designed as separate components fixed to the penetration element.

6. The cable bushing of claim 1, wherein the first flanges of the profile supports have recesses in addition to the snap-on elements, which contribute to an increase in contact surface and therefore a better connection between the potting mass arranged in the recess or shaping and the first flanges of the profile supports.

7. The cable bushing of claim 1, wherein, in the installed state, the first flanges of the two profile supports extend beyond the potting mass so that the potting mass is positioned contact-free relative to the ribbon cable within the recess or shaping.

8. The cable bushing of claim 1, wherein the snap-on elements of the first flanges of the two profile supports are designed in the form of resilient snap-on tabs.

9. The cable bushing of claim 1, wherein the two profile supports consist of metal or heat-resistant plastic.

10. The cable bushing of claim 1, wherein the two profile supports are designed as L-shaped, H-shaped, I-shaped or T-shaped profile supports.

11. The cable bushing of claim 1, wherein the two profile supports have flanges of equal length.

12. The cable bushing of claim 1, wherein the two profile supports have more than one snap-on element to form at least one additional fixation point.

13. The cable bushing of claim 1, wherein the two profile supports each have the same fixation points.

14. The cable bushing of claim 1, wherein spacers are used for variation of the design height and protection of the ribbon cable.

15. The cable bushing of claim 1, wherein the spacers are fixed with the profile supports of the ribbon cable by connection elements.

16. The cable bushing of claim 1, wherein the spacers are glued to the ribbon cable.

17. The cable bushing of claim 1, wherein the second flanges of the profile supports are provided with a glue surface that is closed fluid-tight to the penetration element.

18. The cable bushing of claim 17, wherein the glue surface is additionally provided with sealing material, which after installation enters into a fluid-tight connection with the penetration element and replaces the shaping and potting mass.

* * * * *